(12) United States Patent
Miyamoto et al.

(10) Patent No.: US 7,349,300 B2
(45) Date of Patent: Mar. 25, 2008

(54) OPTICAL DISK APPARATUS HAVING VARIABLE REPRODUCTION SPEED FUNCTION

(75) Inventors: Takashi Miyamoto, Tokorozawa (JP); Tadashi Yamaguchi, Mitaka (JP)

(73) Assignee: TEAC Corporation, Tokyo (JP)

( * ) Notice: Subject to any disclaimer, the term of this patent is extended or adjusted under 35 U.S.C. 154(b) by 880 days.

(21) Appl. No.: 10/840,021

(22) Filed: May 6, 2004

(65) Prior Publication Data
US 2004/0252610 A1 Dec. 16, 2004

(30) Foreign Application Priority Data
May 8, 2003 (JP) .............................. 2003-129865

(51) Int. Cl.
*G11B 7/00* (2006.01)
(52) U.S. Cl. .................................. 369/47.1; 369/47.38
(58) Field of Classification Search ............... 369/47.1, 369/47.27, 47.38, 53.44, 53.45, 53.43, 53.3
See application file for complete search history.

(56) References Cited

U.S. PATENT DOCUMENTS 6,414,926 B1  7/2002  Sugiyama et al.

2003/0012100 A1  1/2003  Takahashi
2004/0008600 A1  1/2004  Furukawa et al.

FOREIGN PATENT DOCUMENTS

| JP | 62-45793 | | 3/1987 | |
|---|---|---|---|---|
| JP | 408084319 | * | 3/1996 | .............. 369/47.38 |
| JP | 9-171679 | | 6/1997 | |
| JP | 10-261255 | | 9/1998 | |
| JP | 2001-285771 | | 10/2001 | |
| JP | 3084075 | | 11/2001 | |
| JP | 2002367276 | | 12/2002 | |
| WO | WO 03/025934 A1 | | 3/2003 | |

* cited by examiner

*Primary Examiner*—Nabil Hindi
(74) *Attorney, Agent, or Firm*—Christensen O'Connor Johnson Kindness PLLC

(57) ABSTRACT

An optical disk apparatus which varies a rotational speed of an optical disk through use of a sound volume controller. A controller of the optical disk apparatus causes a sound volume controller to act as a rotational speed controller upon receipt of a READ command from a host apparatus. The controller detects a set position of the sound volume controller on the basis of a signal output from the same and controls a spindle motor in accordance with a detected position, thereby changing a rotational speed of said optical disk. When wind sound or the like, of the optical disk is obtrusive for the user, the user can diminish noise by means of decreasing the rotational speed through actuation of the sound volume controller.

14 Claims, 7 Drawing Sheets

OPTICAL DISK APPARATUS HAVING VARIABLE REPRODUCTION SPEED FUNCTION

BACKGROUND OF THE INVENTION

1. Field of the Invention

The present invention relates to an optical disk apparatus, and more particularly, to a technique for adjusting a speed at which data on an optical disk are to be reproduced.

2. Prior Art

In the field of an optical disk apparatus which records and reproduces data on and from an optical disk, such as a CD or a DVD, a technique for rendering a data reproduction speed not constant but variable has been known. For instance, a prior art reference provided below describes a technique for reducing a rotational speed of a CD when a tray transport operation key is actuated for a short period of time and performing ordinary CD tray transport operation when the tray transport operation key is pressed for a comparatively long period of time.

Japanese Utility-Model Registration No. 3084075

Generally, with a view toward increasing the data reproduction speed, an optical disk apparatus rotationally drives an optical disk to reproduce data at a highest possible speed. Particularly, an optical disk apparatus for use with a computer is required to perform high-speed access, and hence in many cases the optical disk apparatus is driven at high speed. In association with an increase in a rotational speed, noise of the optical disk apparatus, such as wind noise, has become a problem to be addressed.

According to the previously-described technique, vibration and operating noise are diminished by means of decreasing the rotational speed with the tray transport operation key; that is, a so-called eject key. However, the eject key is frequently used during normal operation as well. The user encounters difficulty in accurately selecting one from tray transport function and rotational speed adjustment function in accordance with the purpose. For example, a user who originally intends to decrease the number of rotations can also be assumed to eject a CD tray through faulty operation.

SUMMARY OF THE INVENTION

The present invention provides an optical disk apparatus which enables a user to readily and reliably adjust the data reproduction speed of an optical disk, thereby suppressing noise of the apparatus, such as wind noise, to a desired level.

An optical disk apparatus of the present invention comprises: reproduction means for reproducing data recorded on the optical disk; sound volume control means which can be manually actuated and is for adjusting a sound level of sound data, when the data reproduced by the reproduction means are in the form of sound data; and control means which receives a signal output from the sound volume control means and causes the sound volume control means to act as reproduction speed control means by means of adjusting a reproduction speed of the reproduction means in accordance with the signal when a reproduction state of the optical disk is a predetermined state.

The sound volume control means has the function of adjusting an output level of the sound data. When the optical disk is in a predetermined reproduction state, the control means adjusts the reproduction speed of the reproduction means in accordance with the signal output from the sound volume control means. The user manually actuates the sound volume control means in said predetermined reproduction state, thereby arbitrarily adjusting the reproduction speed. Adjustment of the reproduction speed is, more specifically, adjustment of a rotational speed of the optical disk. When the optical disk is in a predetermined reproduction state, the user adjusts the sound volume control means, thereby adjusting the rotational speed to a desired speed and suppressing noise of the optical disk apparatus, such as wind noise.

In one embodiment of the present invention, when a command input from an external device, such as a host apparatus, is a READ command signifying reading of data, the control means causes the sound volume control means to act as the reproduction speed control means. In the case of the READ command, reproduced sound data are supplied to the host apparatus even when the optical disk is for recording sound or image data. The sound data are not output from a sound output terminal of the optical disk apparatus, whereupon the sound volume control means becomes ineffective. When the sound volume control means becomes ineffective, the user can adjust the reproduction speed without fail by means of controlling the reproduction speed in accordance with the signal output from the sound volume control means.

In another embodiment of the invention, in an initial state the reproduction means reproduces the data at a predetermined reproduction speed. When the command input from the outside is a read command signifying reading of data, the control means changes the predetermined reproduction speed to a set reproduction speed indicated by the reproduction speed control means. When an anomaly has arisen in reproducing operation of the reproduction means after the predetermined reproduction speed has been changed to the set reproduction speed indicated by the reproduction speed control means, the reproduction speed may be automatically set to a reproduction speed which is equal to or less than the set reproduction speed. In the present invention, the user can arbitrarily adjust the reproduction speed through use of the sound volume control means. Consequently, there is a potential risk of occurrence of a failure to normally reproduce data from the optical disk at the reproduction speed set by the user (particularly, when the reproduction speed is set to a high speed). Therefore, in the event that an anomaly has arisen in reproducing operation, the control means determines that the reproduction speed set by the user is not appropriate and automatically sets the reproduction speed to a speed which is equal to or less than the reproduction speed set by the user, thereby addressing the anomaly in reproducing operation.

In yet another embodiment of the present invention, the optical disk apparatus further has display means for displaying the set reproduction speed indicated by the reproduction speed control means. When the set reproduction speed is displayed on the host apparatus connected to the optical disk apparatus, the display means supplies set reproduction speed information to the host apparatus.

The invention will be more clearly comprehended by reference to the embodiments provided below. However, the scope of the invention is not limited to these embodiments.

BRIEF DESCRIPTION OF THE DRAWINGS

FIG. 4 is a flowchart of processing to be performed when power is turned on;

DESCRIPTION OF THE PREFERRED EMBODIMENT

An embodiment of the present invention will be described hereinbelow by reference to the drawings.

Figure 1:
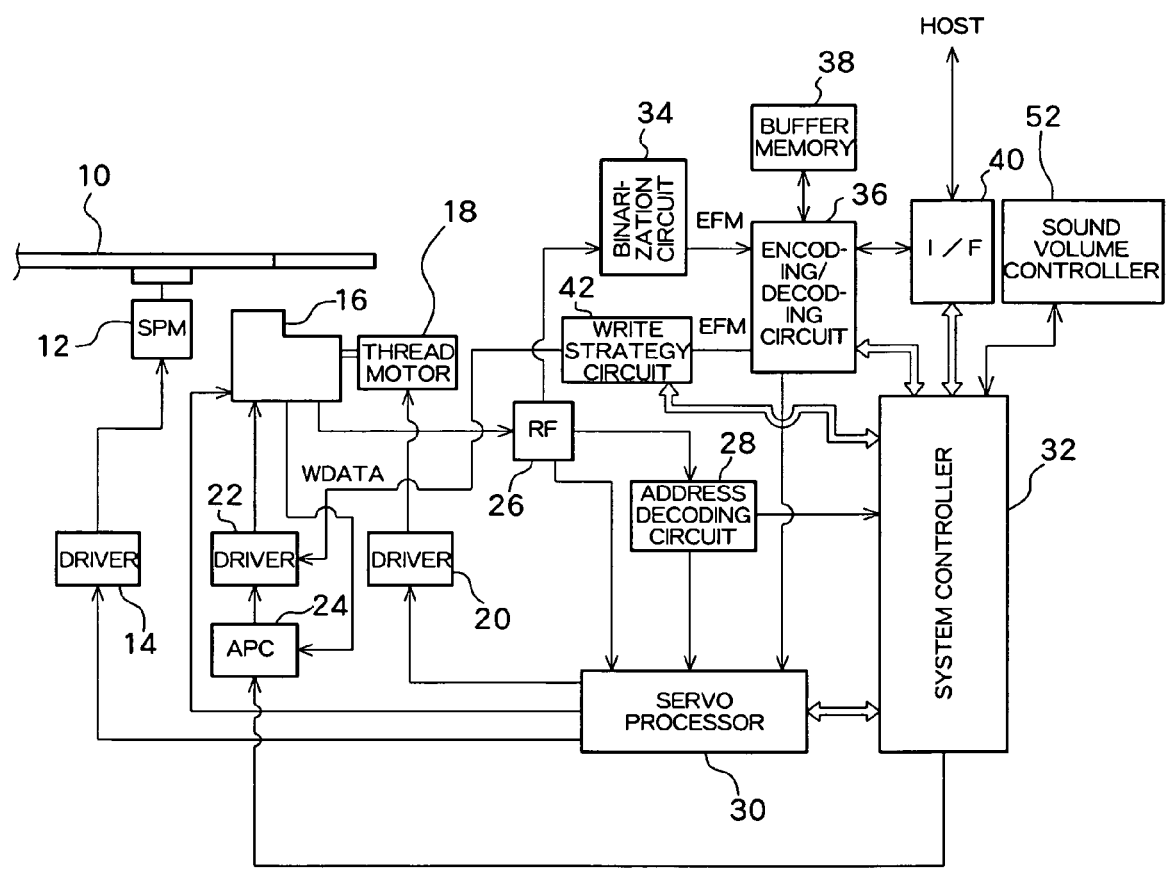
FIG. 1 is a block diagram showing the entirety of an optical disk apparatus.

FIG. 1 shows a block diagram of the entirety of an optical disk apparatus according to the embodiment. An optical disk 10, such as a CD or a DVD, is rotationally driven by a spindle motor (SPM) 12. The spindle motor SPM 12 is driven by a driver 14, and the driver 14 is servo-controlled by a servo processor 30 so as to yield a desired rotational speed.

An optical pickup 16 includes a laser diode (LD) for radiating a laser beam on the optical disk 10, and a photodetector (PD) which receives light reflected from the optical disk 10 and converts the thus-received light into an electrical signal. The optical pickup 16 is disposed opposite the optical disk 10. The optical pickup 16 is driven in a radial direction of the optical disk 10 by a thread motor 18, and the thread motor 18 is driven by a driver 20. The driver 20 is servo-controlled by the servo processor 30 in the same manner as is the driver 14. Moreover, the LD of the optical pickup 16 is driven by a driver 22, and the driver 22 is controlled by an auto power control circuit (APC) 24 such that a drive current assumes a desired value. The APC 24 controls the drive current of the driver 22 such that optimum power is achieved.

When the data recorded on the optical disk 10 are reproduced, the laser beam of reproducing power is emitted from the LD of the optical pickup 16, the light reflected from the optical disk 10 is converted into an electrical signal by means of the PD, and the thus-converted electrical signal is then output. A reproduced signal output from the optical pickup 16 is supplied to an RF circuit 26. The RF circuit 26 generates a focus error signal and a tracking error signal from the reproduced signal and supplies the thus-produced signals to the servo processor 30. In accordance with these error signals, the servo processor 30 subjects the optical pickup 16 to servo control, thereby maintaining the optical pickup 16 in an on-focus state and an on-track state. Moreover, the RF circuit 26 supplies to an address decoding circuit 28 an address signal contained in the reproduced signal. The address decoding circuit 28 demodulates address data pertaining to the optical disk 10 from the address signal and supplies the thus-demodulated address data to the servo processor 30 and a system controller 32.

An example of the address signal is a wobble signal employed in the case of a CD-RW disk. A track of the optical disk 10 is wobbled by means of a modulation signal having time information representing the absolute address of the optical disk 10. This wobble signal is extracted from the reproduced signal, and the thus-extracted wobble signal is decoded, to thereby enable generation of address data (ATIP). In the case of a DVD-RW disk, address data can be acquired in accordance with a land prepit scheme. In the case of a DVD-RAM disk, address data can be acquired in accordance with a complimentary allocated pit addressing (CAPA) scheme, and address data exist in a header section recorded in a sector. The RF circuit 26 supplies a reproduced RF signal to a binarization circuit 34. The binarization circuit 34 binarizes the reproduced signal and supplies the resultantly-produced EFM signal (for a CD)/8-16 modulation signal (for a DVD) to an encoding/decoding circuit 36. The encoding/decoding circuit 36 subjects the binarized signal to EFM demodulation/8-16 demodulation and error correction, to thereby produce reproduced data, and outputs the thus-reproduced data to a host apparatus, such as a personal computer, by way of an interface I/F 40. When reproduced data are output to the host apparatus, the encoding/decoding circuit 36 outputs the reproduced data after having temporarily stored the same in buffer memory 38.

When data are recorded on the optical disk 10, data to be recorded, which have been input by way of the host apparatus, are supplied to the encoding/decoding circuit 36 by way of the interface I/F 40. The encoding/decoding circuit 36 stores the data to be recorded in the buffer memory 38, encodes the data to be recorded, and supplies the thus-encoded data to a write strategy circuit 42 as EFM data or 8-16 modulated data. The write strategy circuit 42 converts the EFM data into a multi-pulse (a pulse train) in accordance with a predetermined recording strategy and supplies the thus-converted multi-pulse to the driver 22 as recording data. A recording strategy is constituted of, e.g., the width of a leading pulse or that of a trailing pulse in multiple pulses, or a pulse duty. Since the recording strategy affects recording quality, a certain optimum strategy is usually fixedly set. The laser beam whose power has been modulated by the recording data is emitted from the LD of the optical pickup 16, whereupon the data are recorded on the optical disk 10. Data recording is performed on a per-packet basis as in the case of the prior art. After the data have been recorded on a per-packet basis, the optical pickup 16 radiates a laser beam of reproduction power, thereby reproducing the recorded data, and supplies the thus-recorded data to the RF circuit 26. The RF circuit 26 supplies the reproduced signal to the binarization circuit 34, and the binarized EFM data or 8-16 modulated data are supplied to the encoding/decoding circuit 36. The encoding/decoding circuit 36 decodes the EFM data or 8-16 modulated data and verifies the thus-decoded data against the recording data stored in the buffer memory 38. A result of verification is supplied to the system controller 32.

The system controller 32 controls operations of individual sections, such as operation of the encoding/decoding circuit 36 and that of the servo processor 30. Moreover, the system controller 32 receives a signal output from a sound volume controller 52 provided at a predetermined position on the optical disk apparatus; for example, a front section, and commands the servo processor 30 to change the rotational speed of the optical disk 10 in accordance with the thus-received signal. When the command thus input from the host apparatus corresponds to a command of PLAY Audio system, the sound data that have been read from the optical disk 10 and demodulated by the encoding/decoding circuit 36 are supplied to the sound volume controller 52 by way of the system controller 32 and output to a sound output terminal at a sound level adjusted by the sound volume controller 52. In contrast, when the command input by way of the host apparatus corresponds to a command of READ system, the data demodulated by the encoding/decoding circuit 36 are not supplied to the sound volume controller 52 and are output, in their unmodified form, to the host apparatus. Therefore, when having received the READ command, the system controller 32 renders ineffective the sound volume control function of the sound volume controller 52 and employs the sound volume controller 52 as a switch for controlling a rotational speed of the optical disk 10 rather than as the sound volume control function. More specifically, the system controller 32 having detected input of the READ command detects the set position of the sound volume controller 52 in accordance with the signal output from the sound volume controller 52, and changes a target rotational speed of the servo processor 30 in response to the set position. The servo processor 30 controls the driver 14 such that a newly-set target rotational speed is achieved.

Figure 2:
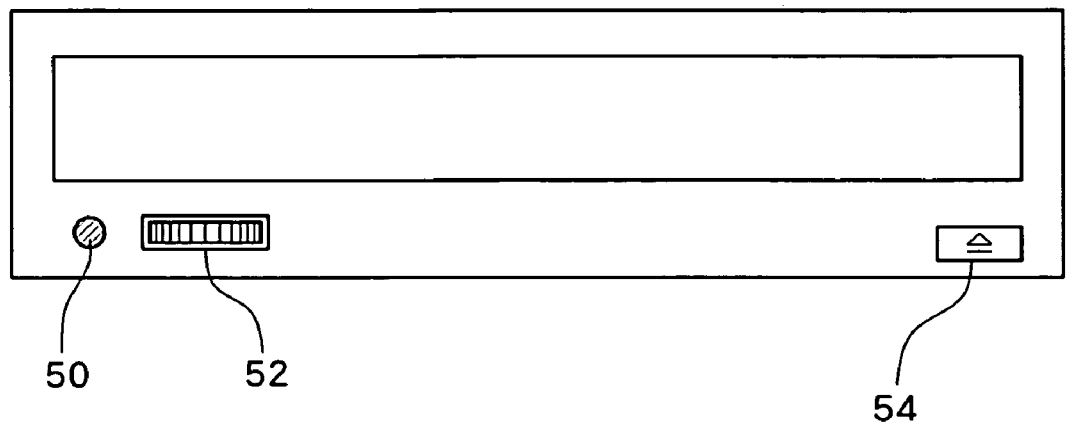
FIG. 2 is a front view of the optical disk apparatus.

FIG. 2 shows a front view of the optical disk apparatus. A sound output terminal 50 for use with headphones and the sound volume controller 52 are provided at a lower portion of a retractable tray section of the optical disk apparatus. Moreover, there is provided a tray switch (eject key) 54 to be used for ejecting and retracting the tray section. When the OS of the personal computer, acting as the host apparatus, is Windows (Registered Trademark) 95 or the like, a PLAY command is output from the host apparatus at the time of reproduction of data from the optical disk 10. In contrast, when the OS is Windows (Registered Trademark) XP, the host apparatus outputs the READ command. The system controller 32 receives the command from the personal computer. When the received command is the PLAY command, the sound data reproduced from the optical disk are output to the sound output terminal 50. When the received command is the READ command, the sound data reproduced from the optical disk are output not to the sound output terminal 50 but to the personal computer serving as the host apparatus. As mentioned above, the OS of the host apparatus determines whether to render the sound output terminal 50 and the sound volume controller 52 effective or ineffective. In any event, the system controller 32 effectively utilizes the sound volume controller 52 which is made functionally ineffective when no sound data are output from the sound output terminal 50, to thus cause the sound volume controller 52 to act as a volume controller not for controlling a sound level but for controlling the rotational speed of the optical disk 10. The system controller 32 can also be said to switch the function of the sound volume controller 52 from the sound control function to the rotational speed control function while taking, as a trigger, the READ command input by the host apparatus.

Figure 3:
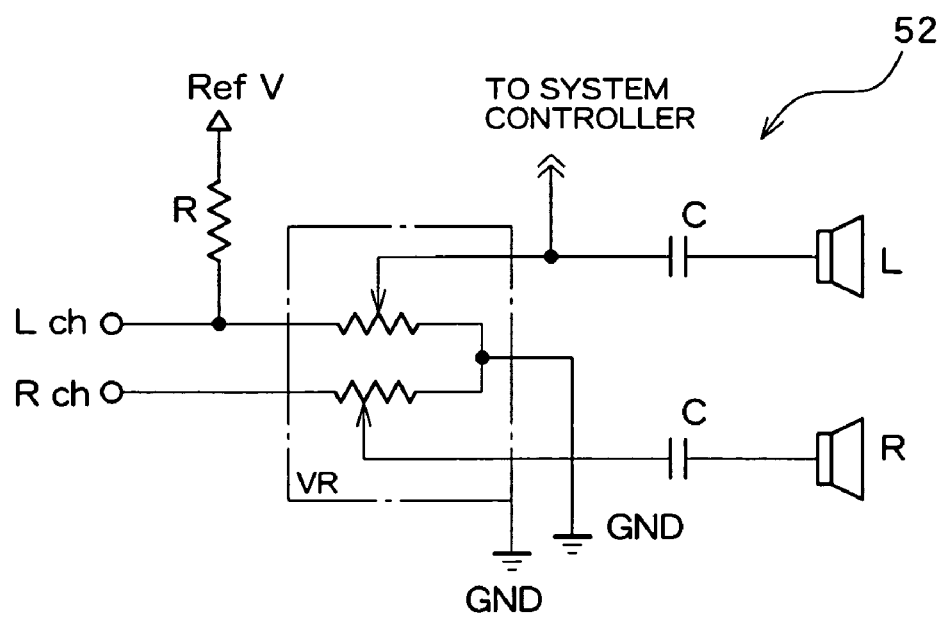
FIG. 3 is a circuit diagram of a volume controller.

FIG. 3 shows a circuit diagram of the sound volume controller 52 shown in FIGS. 1 and 2. The sound volume controller 52 is equipped with input terminals for receiving an L-channel (Lch) stereo sound signal and an R-channel (Rch) stereo sound signal, respectively; a variable resistor VR connected to the respective input terminals; and sound output terminals L, R connected to the variable resistor VR. Capacitors C are connected between the respective sound output terminals L and R and the variable resistor VR. Moreover, reference power Ref is connected to the Lch input terminal. A signal line to be connected to the system controller 32 is connected between the variable resistor VR and the capacitor C. The system controller 32 compares a reference voltage V of the reference power Ref with an output voltage of the variable resistor VR supplied by way of the signal line, thereby detecting the set position of the variable resistor VR and controlling the rotational speed in accordance with the set position of the volume controller 52.

A d.c. bias signal derived from the reference power Ref is canceled by the capacitor C interposed between the variable resistor VR and the output terminal L and hence does not affect an ordinary sound signal output.

Processing for controlling the rotational speed through use of the sound volume controller 52 of the embodiment will be described hereinbelow by reference to a processing flowchart.

Figure 4:
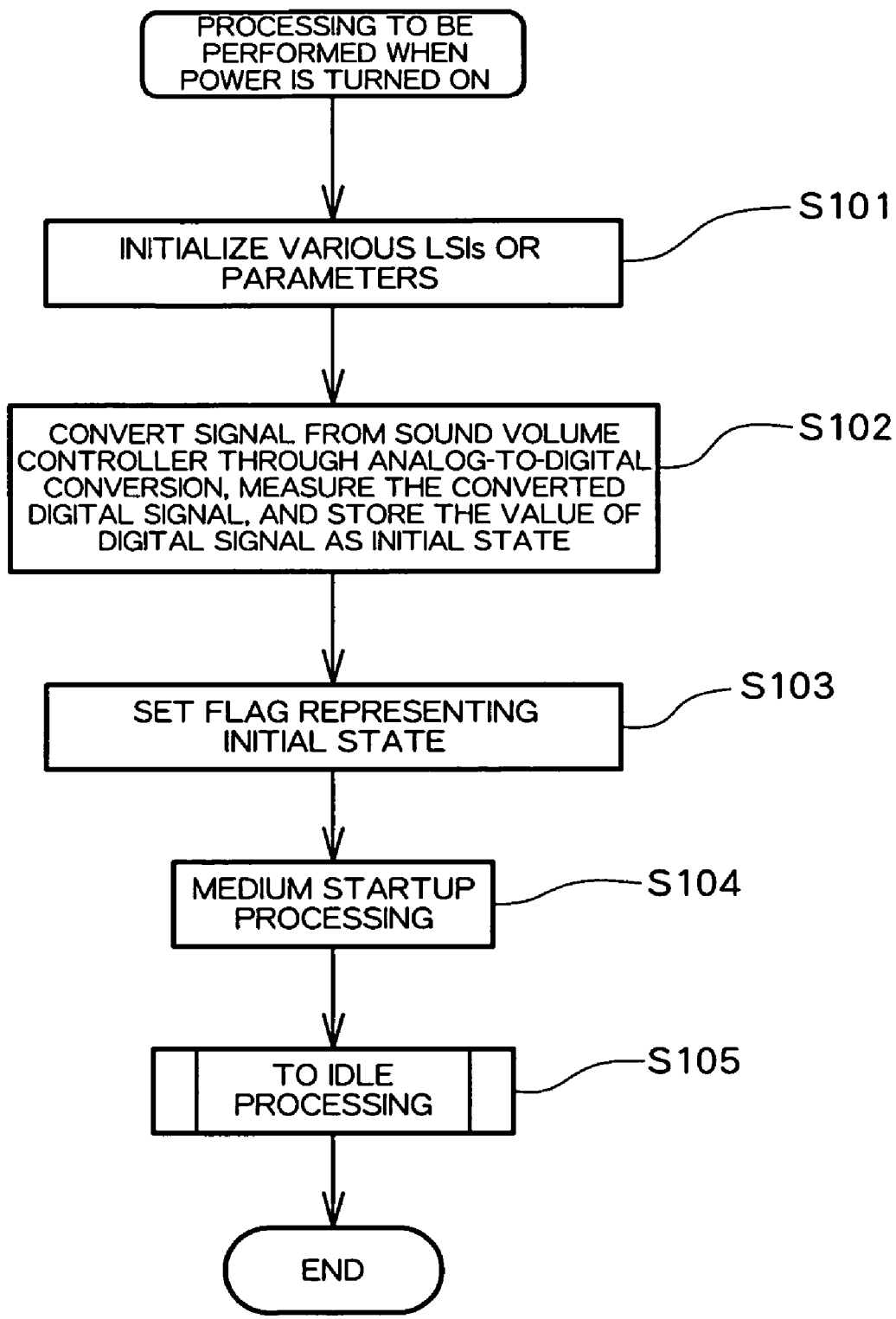

FIG. 4 shows an initial processing flowchart employed when power of the optical disk apparatus is turned on. First, when the power is turned on, various parameters are initialized (S101). The signal output from the sound volume controller 52 is converted into a digital signal by means of an analog-to-digital converter provided in the optical disk apparatus, and the digital signal is stored in memory of the system controller 32 as an initial state value of the sound volume controller 52 (S102). The reason why the initial state value of the sound volume controller 52 is stored in the memory is to detect whether or not the user has manually actuated the sound volume controller 52 from an initial state. Specifically, the position of the sound volume controller 52 is again detected at an appropriate timing, and the thus-detected position is compared with the position for the initial state, thereby detecting whether or not the sound volume controller 52 has been actuated.

After the initial state of the sound volume controller 52 has been stored in the memory, the system controller 32 sets a flag representing the initial state (S103) and executes processing for activating a medium (i.e., the optical disk 10) (S104). Specifically, this medium startup processing is performed to determine the vendor, type, and optimum rotational speed of the optical disk 10 and to rotationally drive the optical disk 10 at the optimum rotational speed. In the embodiment, at least the optical disk 10 identifies whether the optical disk 10 is a CD or a DVD and whether or not the optical disk 10 is an audio CD. After the optical disk 10 has been driven, processing proceeds to IDLE processing (S105). This IDLE processing is performed when the optical disk apparatus awaits a command input from the host apparatus.

Figure 5:
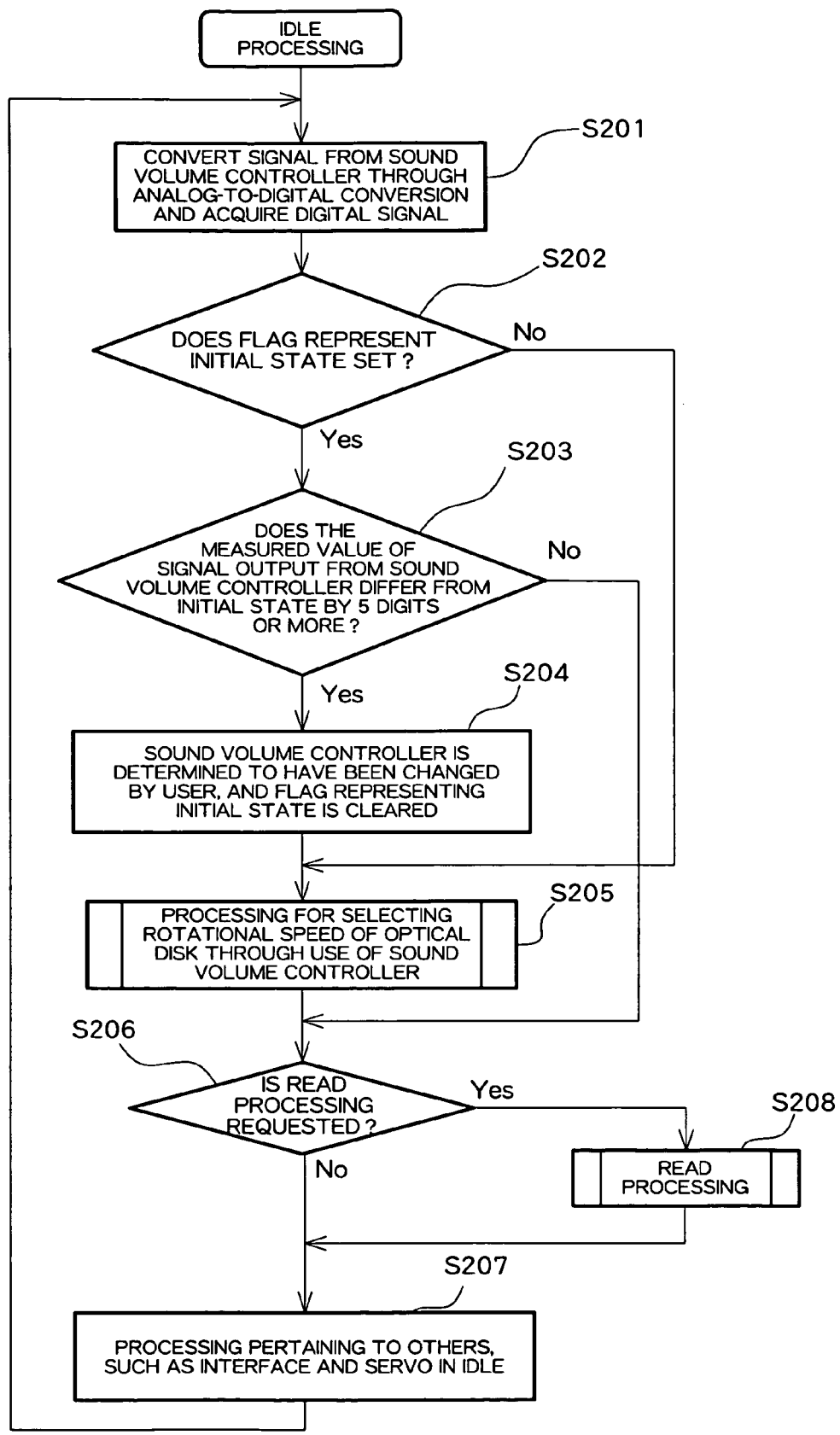
FIG. 5 is a detailed flowchart of IDLE processing shown in FIG. 4.

FIG. 5 shows a detailed flowchart of the IDLE processing. First, in order to ascertain whether or not the user has manually actuated the sound volume controller 52, the system controller 32 receives the signal output from the sound volume controller 52 at predetermined interrupt timing and converts the thus-received signal into the digital signal, thereby acquiring the value of the digital signal (S201). A determination is made as to whether or not the flag representing an initial state is set (S202). Immediately after the optical disk apparatus has been started up, the flag representing an initial state is set in S203. Therefore, YES is selected through determination processing, and a determination is then made as to whether or not a measured value of the sound volume controller 52 acquired in step S201 differs by a predetermined value (e.g., five digits) or more from the initial state value stored in the memory in S102 (S203). This determination processing is an operation for determining whether or not the sound volume controller 52 has been manually actuated from the initial state by a predetermined amount (5 digits). YES is selected when the user has actuated the sound volume controller 52 to a predetermined extent or more, and NO is selected when the user has not actuated the sound volume controller 52.

When the user has manually actuated the sound volume controller 52, the system controller 32 clears the flag showing the initial state (S204) and proceeds to processing for selecting the rotational speed of an optical disk in accordance with the set position of the sound volume controller 52 (S205). Details of this processing will be described later. When the user has not manually actuated the sound volume controller 52, the flag representing the initial state is held set without the foregoing processing being performed. Here, when the flag representing the initial state is not set in S202, the rotational speed of the optical disk is determined to have already been set by means of the sound volume controller, and processing proceeds to processing for selecting the rotational speed of an optical disk in S205.

Next, the system controller 32 determines whether or not the READ command output from the host apparatus has been input (S206). When no READ command has been input, ordinary processing to be performed during IDLE, such as processing pertaining to an interface or a servo, is performed (S207). When the READ command has been input, predetermined READ processing is performed (S208). The rotational speed of the optical disk is not changed to the selected rotational speed immediately after selection in S205 of the rotational speed of the optical disk corresponding to the set position of the sound volume controller 52, but only when the READ command is input. The reason for this is that the sound volume controller 52 does not have the sound volume control function, which is the original function thereof, and can be caused to act as another functional switch when the READ command is input.

Figure 6:
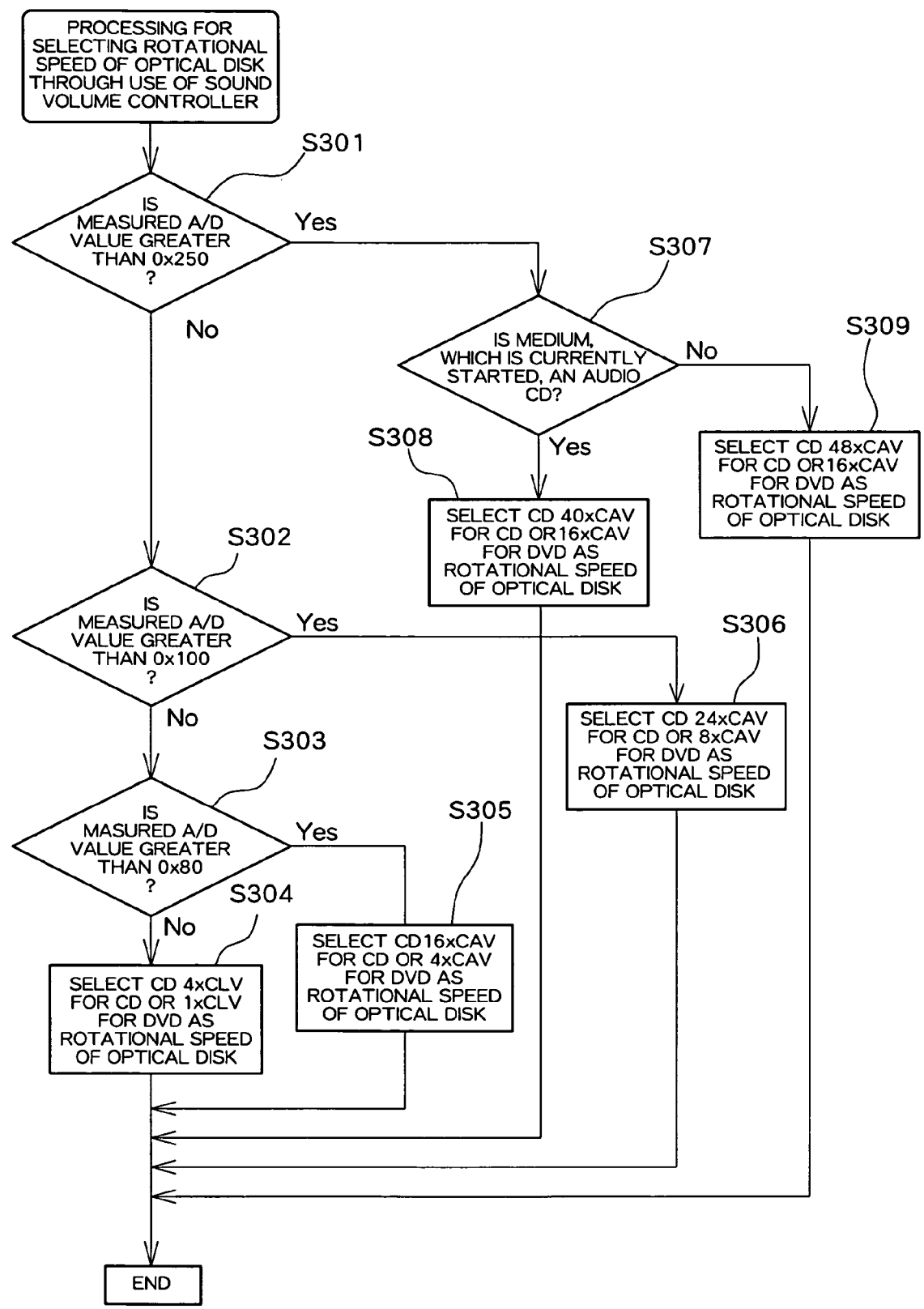
FIG. 6 is a detailed flowchart of disk rotational speed selection processing shown in FIG. 5.

FIG. 6 shows a detailed flowchart of the processing for selecting the rotational speed of the optical disk to be performed in S205. First, the system controller 32 determines the absolute set position of the sound volume controller 52 within a movable range thereof. Specifically, a determination is made as to whether or not the digital value of the sound volume controller 52 is 0×250 (250 is a hexadecimal digit) or more (S301). When the digital value of the sound volume controller 52 is smaller than 250, a NO determination is made. Next, a determination is made as to whether or not the digital value is 0×100 (100 is a hexadecimal digit) or more (S302). When the digital value is smaller than 100, a NO determination is made. Moreover, a determination is made as to whether or not the digital value is 0×80 (80 is a hexadecimal digit) or more (S303). When the digital value is smaller than 80, a NO determination is made, and the absolute position of the sound volume controller 52 is determined to be located in the vicinity of the minimum value within the movable range. A minimum number of rotations is set as the number of rotations of the optical disk. This minimum number of rotations is preferably set in accordance with the type of the optical disk 10. For instance, when the optical disk 10 is a CD, the minimum rotational speed is set to 4× speed. When the optical disk 10 is a DVD, the minimum rotational speed is set to 1× speed. The rotational speed achieved at this time is a speed achieved at a constant linear velocity (CLV) (S304).

Incidentally, when the digital value of the sound volume controller 52; that is, the absolute set position of the sound volume controller 52, ranges from a value of 80 or more to a value of less than 100, YES is selected in S303. In this case, the system controller 32 sets a number of rotations which is higher than the minimum number of rotations. The number of rotations is also set in accordance with the type of the optical disk 10. For instance, when the optical disk 10 is a CD, the number of rotations is set to 16× speed. When the optical disk 10 is a DVD, the number of rotations is set to 4× speed (S305). The rotational speed achieved at this time is a speed achieved at a constant angular velocity (CAV). 16× speed of the CD achieved at an inner radius thereof substantially corresponds to 8× linear velocity.

When the digital value of the sound volume controller 52; that is, the absolute position of the same, ranges from a value of 100 or more to a value of less than 250, a YES determination is made in S302. The system controller 32 selects a rotational speed which is higher than that achieved in S305. For instance, when the optical disk 10 is a CD, 24× speed is selected. When the optical disk 10 is a DVD, 8× speed is selected (S306).

When the digital value of the sound volume controller 52; that is, the absolute position of the same, is 250 or more, a YES determination is made in S301, and the set position of the sound volume controller 52 is determined to be located in the vicinity of the maximum value within the movable range of the sound volume controller 52. The system controller 32 determines whether or not the optical disk 10 is an audio CD (S307). This determination takes into account that error correction capability of an audio CD is lower than that achieved in the case of a data CD. When the optical disk 10 is an audio CD, 40× speed is selected, as the rotational speed of the optical disk, for a CD and 16× speed is selected for a DVD (S308). When the optical disk 10 is a data CD, 48× speed is selected for a CD and 16× speed is selected, as the rotational speed of the optical disk, for a DVD (S309). The rotational speeds selected in S308 and S309 are the maximum rotational speeds of the optical disk 10 corresponding to the types thereof.

As mentioned above, after selection of the set position of the sound volume controller 52 (i.e., the absolute set position of the sound volume controller 52 within the movable range thereof) and the rotational speed of the optical disk 10 in accordance with the type thereof, the rotational speed of the optical disk 10 is changed to the selected rotational speed through read processing which will be described below.

In FIG. 6, the movable range of the sound volume controller 52 is divided into four ranges, and a rotational speed is selected by determining that the range within which the set position of the sound volume controller 52 falls. However, the movable range can also be divided into a greater number of smaller ranges, as required. The system controller 32 may be provided with a map which shows correspondence between the digital value of the sound volume controller 52 and the rotational speed and has previously been stored in the memory. The system controller 32 may select a rotational speed on the basis of a digital value by reference to the map.

Figure 7:
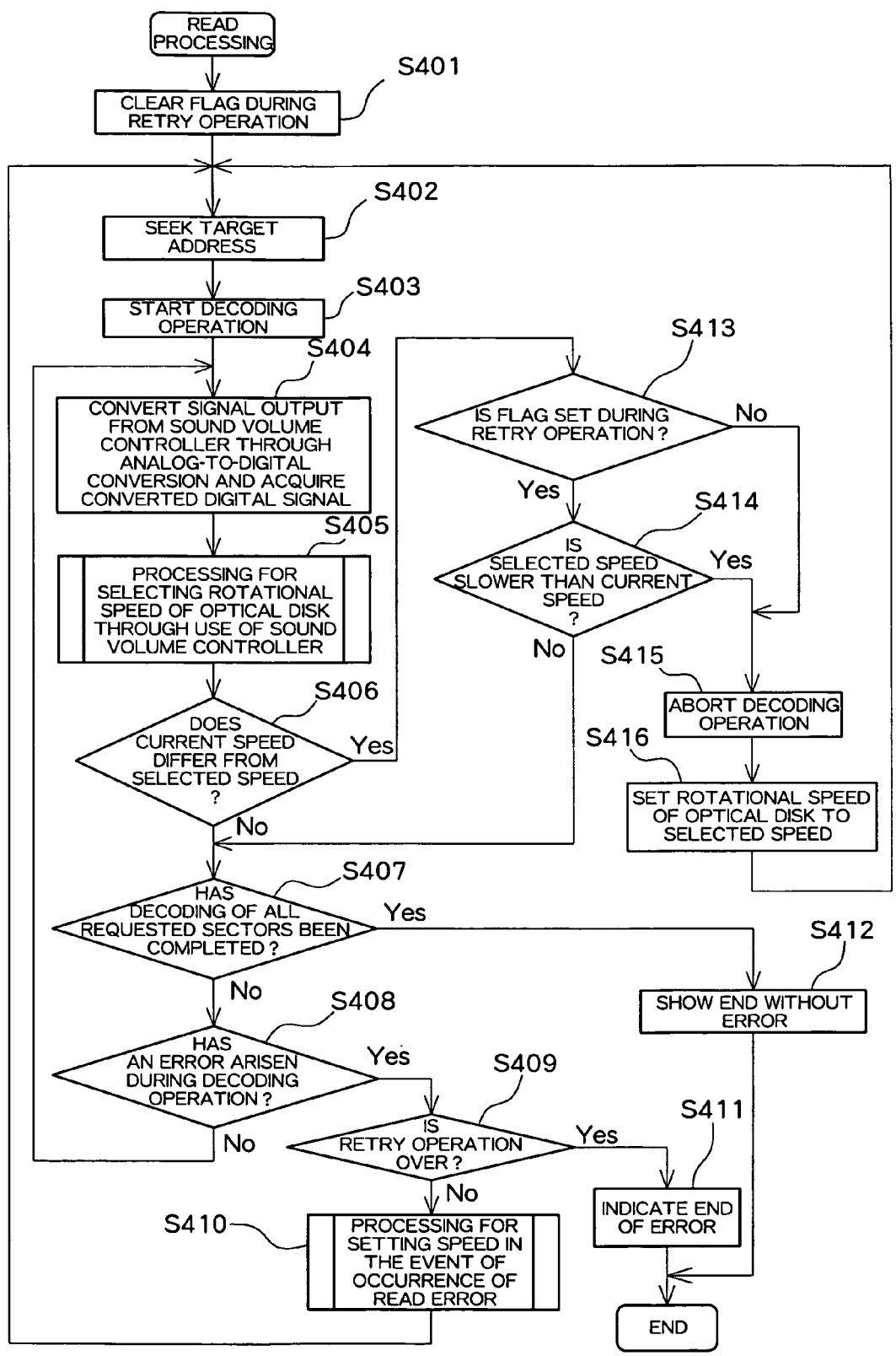
FIG. 7 is a detailed flowchart of read processing shown in FIG. 5.

FIG. 7 shows a detailed flowchart of the read processing pertaining to S208. First, the system controller 32 clears a flag for which a retry is being performed (simply called a "retry flag") (S401). Here, the retry flag is a flag set when the encoding/decoding circuit 36 has failed to decode data and attempts to reproduce the same data by means of resetting the rotational speed.

Next, the system controller 32 commands the servo processor 30 to cause the optical pickup 16 to seek a target address supplied from the host apparatus (S402). Decoding of data from that address is commenced (S403). Incidentally, the system controller 32 acquires a digital value of the sound volume controller 52 at a predetermined interrupt timing (S404), to there by execute processing for selecting the rotational speed of an optical disk in accordance with the set position of the sound volume controller 52 (S405). When the set position of the sound volume controller 52 is identical with that selected in S201, the rotational speed selected in S205 is continuously maintained without modification as the rotational speed selected in S405. A determination is then made as to whether or not the current rotational speed differs from that selected in S405 (S406).

When coincidence exists between the current rotational speed and the selected rotational speed, a NO determination is made, and the system controller 32 determines whether or not all the sectors requested by the host apparatus have been decoded at the current rotational speed (S407). When decoding of all the data sets has not yet been completed, a determination is made as to whether or not an error has arisen during the course of decoding operation (S408). When an error has arisen during the course of decoding operation, a retry is required. For this reason, a determination is first made as to whether or not a retry time has exceeded a predetermined period of time (e.g., seven seconds) (S409). If the retry time has not yet exceeded the predetermined period of time, processing proceeds to processing for setting a speed in the event of occurrence of a predetermined read error (S410). As will be described later, during the processing to be performed in the event of occurrence of a read error, a decode error is determined to have arisen for reasons of an excessively high rotational speed, and there is performed processing for automatically setting a rotational speed regardless of the set position of the sound volume controller 52.

When in S409 the retry time is determined to have already lapsed, the system controller 32 outputs, to the host apparatus, data representing that the decoding operation has been aborted and ended in a failure (S411). In contrast, when in S407 decoding of all the required sectors is determined to have been completed, the system controller 32 outputs, to the host apparatus, data representing that decoding operation has been completed without failures (S412).

When a difference exists between the current rotational speed and the selected rotational speed, a YES determination is made in S406, whereupon the system controller 32 determines whether or not the retry flag is set (S413). When the retry flag is set, a determination is further made as to whether or not the selected rotational speed is slower than the current rotational speed (S414). When the selected rotational speed (i.e., the rotational speed automatically set for retry purpose by the system controller 32) is higher than the current rotational speed, processing proceeds to processing pertaining to S407, which has already been described, at the rotational speed achieved at that time; that is, the current rotational speed, thereby decoding the data. In contrast, when the current rotational speed is higher than the selected rotational speed, decoding operation is aborted (S415), and the rotational speed of the optical disk 10 is set to the selected rotational speed (S416), thereby decoding the data. Moreover, when in S413 the retry flag is determined not to be set, the decoding operation is aborted, and the rotational speed is changed in order to change the current rotational speed to the selected rotational speed in accordance with the result of determination made in S406 (S415, S416).

Figure 8:
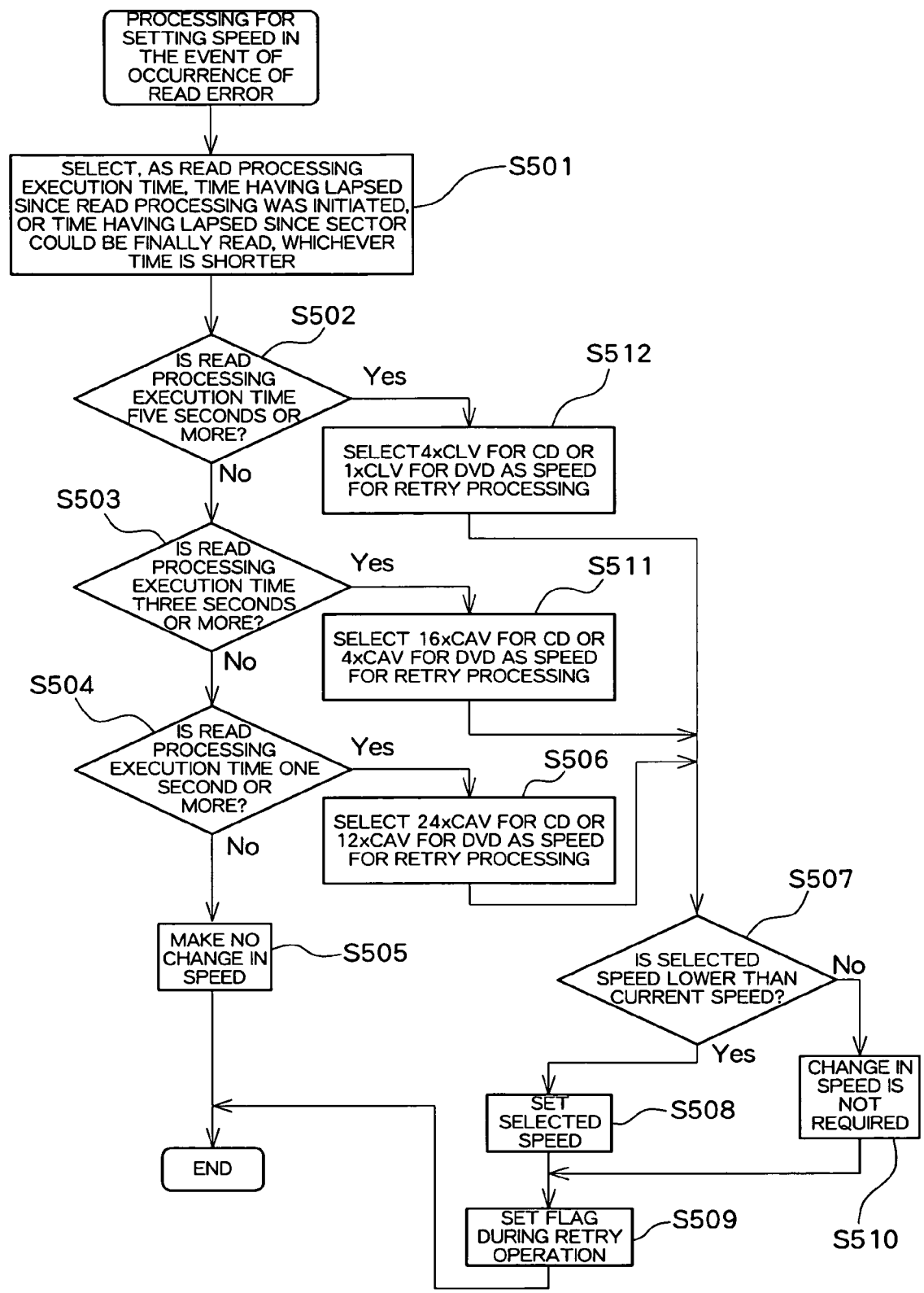
FIG. 8 is a detailed flowchart of processing for setting a speed at the time of occurrence of a read error, which is shown in FIG. 7.

FIG. 8 shows a detailed flowchart of processing for setting a rotational speed in the event of occurrence of a read error to be performed in S410. First, when an error has arisen during decoding operation, there is selected, as a read processing execution time, a time having lapsed since read processing was initiated, or a time having lapsed since a sector could be finally, successfully read without errors, whichever time is shorter (S501). The read processing time is updated every time reading operation can be performed without errors and reflects a retry time which arises after occurrence of a read error. The shorter the read processing execution time, the fewer the errors. The system controller 32 counts the read processing execution time, thereby determining whether or not the read processing execution time has entailed five seconds or more (S502). If the read processing execution time is less than five seconds, a determination is made as to whether or not the read processing execution time is three seconds or more (S503). When the read processing execution time is less than three seconds, a determination is further made as to whether or not the read processing execution time is one second or more (S504). A case where the read processing execution time is less than one second indicates few read errors, and the current rotational speed is determined to be essentially appropriate, and no change is made to the rotational speed (S505).

When the read processing execution time ranges from one second or more to less than three seconds, read errors arise comparatively frequently. The rotational speed is determined to be inappropriately high, and CD 24× speed and DVD 12× speed (constant angular velocity) are selected as rotational speeds for retry (S506).

When the read processing execution time ranges from three seconds or more to less than five seconds, additional read errors frequently arise. The rotational speed is determined to be more inappropriately high, and CD 16× speed and DVD 4× speed (constant angular velocity) are selected as rotational speeds for retry (S511).

When the read processing execution time is five seconds or more, more additional read errors frequently arise. The rotational speed is determined to be much more inappropriately high, and CD 4× speed and DVD 1× speed (standard) (constant linear velocity) are selected as rotational speeds for retry (S512).

As mentioned above, after the rotational speed for retry operation has been selected in accordance with whether the read processing execution time is long or short; that is, in accordance with frequency of occurrence of a read error, the current rotational speed is compared with the selected rotational speed (S507). When the selected rotational speed is lower than the current rotational speed, the rotational speed is set to a rotational speed which has been selected for the chance of successful retry (S508), and the retry flag is set (S509). In this case, the current speed is changed to the selected rotational speed, and hence a NO determination is made in S406, and processing proceeds to S407, where a retry is executed.

When in S507 the selected rotational speed is determined to be faster than the current rotational speed, the current rotational speed is maintained (S510) without modification (S510), and the retry flag is set (S509). In this case, a YES determination is made in S406, and a YES determination is also made in S413, because the retry flag is set. A NO determination is made in S414, because the current rotational speed is lower than the selected rotational speed. Processing proceeds to S407, where a retry is performed.

As mentioned above, in the event that a read error has arisen, the optical disk apparatus performs a retry by means of automatically setting a rotational speed which is lower than the current rotational speed regardless of the set position of the sound volume controller 52. Even when the rotational speed set by the user is not always appropriate (particularly when the user sets the set position of the sound volume controller 52 to the maximum number of rotations, thereby causing high-speed rotation), reliable reproduction of data can be ensured. When a retry has been completed normally, processing again shifts to processing pertaining to S401 shown in FIG. 7, and a rotational speed corresponding to the set position of the sound volume controller 52 is selected and set in S405.

Although the embodiment of the present invention has been described thus far, the present invention is not limited to the embodiment and is susceptible to various modifications.

For instance, in the embodiment, when no sound data are output from the sound output terminal 50, the user adjusts the sound volume controller 52, thereby arbitrarily adjusting the rotational speed of the optical disk 10. However, the rotational speed set by the user may be displayed on a display device of the host apparatus. More specifically, after having detected the digital value of the sound volume controller 52 in S301 to S303, the system controller 32 sends the detected value to the host apparatus, where the host apparatus displays the detected value in the form of bars or a numeral. Although displaying a current sound level in the form of bars is known, a rotational speed may be displayed in the form of bars in place of the sound level. Switching the display of a sound level to the display of a rotational speed also yields an effect of informing the user of occurrence of switching of the sound volume controller 52. The current rotational speed can also be displayed on a main unit of the optical disk apparatus.

In the embodiment, the rotational speed is changed stepwise among 4× speed, 16× speed, 24× speed, 40× speed, and 48× speed in the case of a CD, in accordance with the absolute set position of the sound volume controller 52 within the movable range thereof. In the case of a DVD, the rotational speed is changed stepwise among 1× speed, 4× speed, 8× speed, and 16× speed. However, the rotational speed may be changed consecutively in accordance with the absolute set position of the sound volume controller 52.

Instead of the minimum set position of the sound volume controller 52 within the movable range thereof being taken as 1× speed and the maximum position of the same being taken as the nominal maximum number of rotations of the optical disk 10, the maximum position may be set to a number of rotations which exceed the nominal maximum number of rotations of the optical disk.

Moreover, in the embodiment, the rotational speed is adjusted in accordance with the absolute set position of the sound volume controller 52 within the movable range thereof. However, the rotational speed may be adjusted in accordance with the amount by which the sound volume controller 52 has been displaced from the initial state thereof. More specifically, the amount by which the sound volume controller 52 has been moved from the initial state thereof is detected in S203. The amount of relative displacement is compared with a threshold value in S301 to S304, whereby the current rotational speed may be incremented or decremented by an amount corresponding to the amount of relative displacement. In this case, the direction in which the sound level of the sound volume controller 52 is increased or decreased is preferably brought into coincidence with the direction in which the rotational speed is increased or decreased; for instance, when the sound volume controller 52 is actuated in such a direction that the sound level is decreased, the rotational speed is reduced.

Moreover, in the present embodiment, startup processing corresponding to a medium in S104 is performed. However, when the optical disk 10 is, e.g., an audio CD or a video DVD, and when the optical disk is automatically driven at a speed lower than that of a data CD or that of a data DVD, the user can rotationally drive the optical disk 10 at a speed higher or lower than that set by the optical disk apparatus through use of the sound volume controller 52.

What is claimed is:

1. An optical disk apparatus, comprising:
    reproduction means for reproducing data recorded on said optical disk;
    sound volume control means which can be manually actuated and is for adjusting a sound level of sound data, when the data reproduced by said reproduction means are said sound data; and
    control means which receives a signal output from said sound volume control means and causes said sound volume control means to act as reproduction speed control means by means of adjusting a reproduction speed of said reproduction means in accordance with said signal when a reproduction state of said optical disk is a predetermined state.

2. The apparatus according to claim 1, wherein,
    when a command input from the outside is a read command signifying reading of data, said control means causes said sound volume control means to act as said reproduction speed control means.

3. The apparatus according to claim 1, wherein,
    said reproduction means reproduces said data at a predetermined reproduction speed in an initial state; and,
    when a command input from the outside is a read command signifying reading of data, said control means changes said predetermined reproduction speed to a set reproduction speed indicated by said reproduction speed control means.

4. The apparatus according to claim 3, wherein,
    when an anomaly has arisen in reproducing operation of said reproduction means after said predetermined reproduction speed has been changed to said set reproduction speed indicated by said reproduction speed control means, said control means automatically sets said reproduction speed to a reproduction speed which is equal to or less than said set reproduction speed.

5. The apparatus according to claim 1, further comprising:
    storage means for storing an initial position of said reproduction speed control means, wherein,
    when an actuation position of said reproduction speed control means has remained unchanged from said initial position, said control means holds said reproduction speed unchanged, but, when said actuation position of said reproduction speed control means has changed from said initial position, said reproduction speed is changed in accordance with an absolute position within a movable range of said reproduction speed control means.

6. The apparatus according to claim 1, wherein
    said reproduction speed control means further comprises:
    an input terminal for said sound data signal;
    a variable resistor serially connected to said input terminal;
    a capacitor serially connected to said variable resistor;
    a sound output terminal serially connected to said capacitor;
    reference power connected between said input terminal and said variable resistor; and
    means for supplying a portion of a signal output from said variable resistor to said control means, wherein
    said control means controls said reproduction speed in accordance with a signal output from said variable resistor.

7. The apparatus according to claim 1, further comprising:
    display means for displaying a set reproduction speed indicated by said reproduction speed control means.

8. The apparatus according to claim 1, wherein
    said control means performs control operation such that a direction in which said sound volume control means is actuated to increase a sound level is brought into coincidence with a direction in which said reproduction speed control means is actuated to increase a reproduction speed.

9. An optical disk apparatus, comprising:
    drive means for rotationally driving an optical disk;

signal processing means for reproducing data recorded on said optical disk;

means for outputting a sound signal when said data obtained through reproduction corresponding to said sound signal;

a sound volume controller which can be manually actuated and controls an output sound level of said sound signal;

means for inputting a command from an external device; and control means for controlling said drive means and said signal processing means in accordance with said command, wherein, when said command is a read command signifying reading of data from said optical disk, a rotational speed of said optical disk is set by said drive means in accordance with a set position of said sound volume controller.

10. The apparatus according to claim 9, wherein,
when said set position of said sound volume controller differs from an initial position thereof, said control means takes a minimum position of said sound volume controller within a movable range thereof as a minimum rotational speed and a maximum position of said sound volume controller within said movable range thereof as a maximum rotational speed, and said rotational speed is set in accordance with said set position of said sound volume controller.

11. The apparatus according to claim 9, further comprising:

means for determining the type of said optical disk, wherein said control means sets said rotational speed in accordance with said set position of said sound volume controller and the type of said optical disk.

12. The apparatus according to claim 11, wherein
said control means performs control operation such that a direction in which said sound volume controller is actuated to increase a sound level is brought into coincidence with a direction in which operation is performed for increasing said rotational speed.

13. The apparatus according to claim 11, wherein,
even when said set position of said sound volume controller is fixed, said control means increases said rotational speed to a greater speed when the type of said optical disk is a CD as compared with a case where said type of said optical disk is a DVD.

14. The apparatus according to claim 11, wherein,
even when said set position of said sound volume controller is fixed, said control means increases said rotational speed to a greater speed when the type of said optical disk is a data CD as compared with a case where said type of said optical disk is an audio DVD.

* * * * *